US012264538B1

(12) United States Patent
Voller-Brown et al.

(10) Patent No.: US 12,264,538 B1
(45) Date of Patent: Apr. 1, 2025

(54) SUNRISE WAKE SYSTEM

(71) Applicant: Etherealco Corporation, Chandler, AZ (US)

(72) Inventors: Benjamin Russell Stephen Voller-Brown, Mesa, AZ (US); Michael Jialin Li, Phoenix, AZ (US)

(73) Assignee: ETHEREALCO CORPORATION, Chandler, AZ (US)

( * ) Notice: Subject to any disclaimer, the term of this patent is extended or adjusted under 35 U.S.C. 154(b) by 0 days.

(21) Appl. No.: 18/793,756

(22) Filed: Aug. 3, 2024

(51) Int. Cl.

| | |
|---|---|
| ***E06B 9/42*** | (2006.01) |
| ***E06B 9/68*** | (2006.01) |
| ***F21S 10/02*** | (2006.01) |
| ***F21V 23/00*** | (2015.01) |
| ***F21V 33/00*** | (2006.01) |
| ***G04B 25/00*** | (2006.01) |

(52) U.S. Cl.
CPC .................. *E06B 9/42* (2013.01); *E06B 9/68* (2013.01); *F21S 10/02* (2013.01); *F21V 23/003* (2013.01); *F21V 33/0056* (2013.01); *G04B 25/005* (2013.01); *E06B 2009/6809* (2013.01)

(58) Field of Classification Search
CPC ......... G04B 47/00; G04C 23/00; G04C 23/18
See application file for complete search history.

(56) References Cited

U.S. PATENT DOCUMENTS

| | | | |
|---|---|---|---|
| 3,798,889 A | 3/1974 | Chadwick | |
| 5,008,865 A | 4/1991 | Shaffer et al. | |
| 5,243,568 A | 9/1993 | Burch et al. | |
| 6,431,730 B1 * | 8/2002 | Deutsch | F21V 33/0016 362/432 |
| 7,280,439 B1 * | 10/2007 | Shaddox | F21V 33/0052 362/1 |
| 8,104,917 B2 * | 1/2012 | Link | H05B 47/155 345/82 |
| 8,259,535 B2 | 9/2012 | Sandu et al. | |
| 8,427,311 B2 | 4/2013 | Schlangen et al. | |
| 8,867,318 B2 | 10/2014 | Suen | |
| 9,195,220 B2 * | 11/2015 | Patton | G04G 15/00 |

(Continued)

FOREIGN PATENT DOCUMENTS

| | | |
|---|---|---|
| DE | 102006013229 A1 | 5/2024 |
| EP | 4287776 A1 | 12/2023 |
| GB | 2308901 A | 7/1997 |

*Primary Examiner* — Edwin A. Leon
*Assistant Examiner* — Jason M Collins
(74) *Attorney, Agent, or Firm* — Invention To Patent Services; Alex Hobson

(57) ABSTRACT

A sunrise wake system includes a sunrise shade assembly that includes a sunrise shade, a blackout shade, configured over a window to block out exterior light and then produce emitted light that mimics the natural light of a sunrise. A person may set a wake time and a sunrise profile and the system will activate at the wake time and run the selected sunrise profile. A mobile phone operating a system APP may interface with the sunrise shade assembly to provide instructions to the shade controller to activate a light strip to emit light that changes in wavelength and temperature according to the sunrise profile. A light strip may include a plurality of light devices that emit different wavelengths of light including a red light device. The light strip may be extended around a portion of the blackout shade to provide a large length and area of light emission.

24 Claims, 7 Drawing Sheets

(56) References Cited

U.S. PATENT DOCUMENTS

| | | | | |
|---|---|---|---|---|
| 9,513,602 | B1 | 12/2016 | Russell et al. | |
| 9,631,426 | B1 * | 4/2017 | Caspa | E06B 9/368 |
| 9,900,956 | B2 * | 2/2018 | Huang | H05B 45/20 |
| 10,676,987 | B2 * | 6/2020 | Hall | E06B 9/68 |
| 10,785,852 | B1 | 9/2020 | Stubbs | |
| 11,293,605 | B1 * | 4/2022 | Massinello | F21V 21/088 |
| 11,415,308 | B1 * | 8/2022 | Haney | A47H 23/00 |
| 11,604,438 | B2 * | 3/2023 | Patton | E06B 9/42 |
| 2005/0254249 | A1 | 11/2005 | Robbins, III | |
| 2011/0211425 | A1 * | 9/2011 | Liu | G04G 15/006<br>368/10 |
| 2011/0240232 | A1 * | 10/2011 | Kluck | E05F 15/79<br>160/5 |
| 2013/0208576 | A1 * | 8/2013 | Loree, IV | G04G 11/00<br>368/256 |
| 2014/0269222 | A1 * | 9/2014 | Patton | E06B 9/68<br>368/73 |
| 2016/0002974 | A1 * | 1/2016 | Boyle | E06B 9/386<br>160/173 R |
| 2016/0113090 | A1 * | 4/2016 | Huang | H05B 45/24<br>315/297 |
| 2016/0143109 | A1 * | 5/2016 | Lal | F21S 6/002<br>362/249.02 |
| 2018/0355662 | A1 * | 12/2018 | Hall | G04C 23/50 |
| 2018/0355663 | A1 * | 12/2018 | Hall | G04C 23/16 |
| 2023/0212389 | A1 | 7/2023 | Patton et al. | |

* cited by examiner

SUNRISE WAKE SYSTEM

BACKGROUND OF THE INVENTION

Field of the Invention

The invention relates to a sunrise wake system configured over a window and configured to produce a sunrise profile of emitted light from a light strip configured on a blackout shade.

Background

Many individuals have lifestyles requiring them to wake up at times that do not align with the natural sunrise. This includes people who prefer to wake up well after sunrise and shift workers who must wake up during daylight hours or at night. These individuals miss the gradual and natural process of waking up with the sunrise, which is generally beneficial as it provides a smooth transition from sleep to wakefulness. Additionally, individuals who sleep during daylight hours face challenges in blocking out sunlight completely. Blackout shades are commonly used to prevent external light from entering through windows, creating the necessary darkness for restful sleep.

However, while blackout shades are effective at darkening a room, they create an environment that can make it difficult for users to wake up naturally. The abrupt transition from complete darkness to artificial light or an alarm can be jarring and less conducive to a smooth wake-up process. Traditional alarm clocks and mobile phone alarms do not provide a gradual light increase that simulates a natural sunrise, which is essential for a natural waking process. Therefore, there is a need for a solution that combines the benefits of blackout shades with a controlled light source that mimics the natural progression of a sunrise, enhancing the wake-up experience for individuals who do not wake up with the actual sunrise. The present invention addresses these issues by integrating a light-emitting device with a blackout shade to simulate natural sunrise, thereby improving the wake-up experience.

SUMMARY OF THE INVENTION

The invention is directed to a sunrise wake system that includes a sunrise shade assembly that includes a sunrise shade configured over a window to block out exterior light and then produce emitted light that mimics the natural light of a sunrise. A person may set a wake time, a sunrise profile, and a wake duration, and then the system will activate at the wake time and run the selected sunrise profile over the wake duration. A mobile electronic device, such as a mobile phone operating a system APP, may interface with the sunrise shade assembly to provide instructions to the shade controller to activate a light strip to emit emitted light that changes in wavelength and temperature according to the sunrise profile. A light strip may include a plurality of light devices and may emit different wavelengths of light. The shade controller may control which light devices and the intensity of the light emitted by the light devices to produce the sunrise profile. The sunrise shade may include a blackout shade and a light strip coupled thereto. The sunrise shade may be coupled to an actuator to move from an open configuration to a closed configuration. A shade actuator may include a spool and a motor, wherein the sunrise shade is spooled about the spool to actuate from an open configuration to said closed configuration.

A sunrise shade includes a blackout shade that is configured to extend over a window and preferably beyond the window perimeter, the perimeter of the glass portion of the window to block out exterior light.

A mobile electronic device may be interfaced with a shade controller of the sunrise wake system to set wake times, set the light strip to illuminate via the sunrise input, set a sound to be emitted or change the type of sound via the sound input, set a wake duration with a wake duration input, and set a sunrise profile via a sunrise profile input. The mobile electronic device may include a controller such as a microprocessor and a wireless signal transceiver that sends a wireless signal to a wireless signal receiver of the sunrise wake system or more specifically to the sunrise shade assembly. An exemplary sunrise profile may be set by a person according to their preference but may be as short as 5 or 10 minutes or more, to about 30 minutes or more, or an hour or more, or even about 90 minutes or more and any range between and including the time durations provided.

The mobile electronic device, such as a mobile phone, may interface with the sunrise shade assembly and enable a person to set a wake time and a wake duration, the time of the sunrise profile from start to end. The end of the sunrise profile may be when the light reaches a set intensity and/or when it becomes constant.

A sunrise profile may be a profile of emitted light that changes in wavelength, intensity and/or temperature. In an exemplary sunrise profile, an initial light phase may include a red emitted light. A warming temperature phase may have emitted light that decreases in temperature but may increase in intensity from the initial light phase. Subsequently, a cooling temperature profile may have emitted light that increases in temperature and increases in intensity or lumens of emitted from the light strip.

A user may provide feedback to the sunrise wake system using their mobile phone, including feedback on the duration, start-time, or warming and/or brightness profiles. The sunrise wake system may use this feedback and machine learning and/or AI to modify the sunrise profile to improve the specific profile for the user. Also, a sunrise wake system may interface with a user's calendar and automatically set a sunrise wake profile including a start time, duration, and specific profiles with respect to the user's calendar. The system may learn that the user does not like to begin the profile before 6:30 am and therefore, may provide a shorter profile on days where the user has calendar items starting at earlier times, such as at 7:30 am for example. The sunrise wake system may take into account the types of calendar items as well, such as a sales meeting versus, a workout session, and again, tailor the sunrise wake profile according to the event(s) on the calendar.

The light profile may begin with red emitted light being emitted from red light devices and then include first emitted light and second emitted light emitted from the respective first light devices and second light devices. The light strip may continue to emit light from the light strip after the wake duration or the sunrise shade may actuate to an open configuration if a detector detects suitable exterior light. The shade actuator may move the sunrise shade with the light strip to an open configuration by rolling the sunrise shade into a spool. The light strip may be flexible and include light-emitting diode (LED) devices.

The sunrise shade assembly may be powered by a battery, which may be a rechargeable battery or may include an electrical plug that can be plugged into a power source, such as an electrical outlet.

An alarm sound may be emitted by the mobile electronic device by a speaker that may be configured on the mobile electronic device or coupled thereto, either with a wire or wirelessly. A speaker may be coupled to the mobile electronic device, such as a mobile phone by a Bluetooth connection, for example. A person may have one or more speakers in their bedroom and these speakers may emit an alarm sound when instructed by the mobile electronic device. The alarm sound may be selected as desired and may be music, natural sounds, such as birds chirping, water flowing, waterfalls, thunderstorms or rain sounds, or other natural sounds, or may be more traditional buzzer sound that is constant or changing in volume, emission, and duration. The sunrise wake system may be set by the user through their mobile electronic device to initiate a natural alarm sound at a specific time with the sunrise profile, such as proximal to the end of the wake profile, wherein the alarm sound is initiated after 50% of the sunrise profile has elapsed. The natural sounds may initially be emitted at first low volume level and then increase in volume to a second higher volume level. If the sunrise profile has not been stopped or if the person has not interfaced with the system prior to the end of the sunrise profile, a buzzer alarm sound may be emitted from the speaker or speakers.

An exemplary sunrise shade assembly includes a sunrise shade that includes a blackout shade that is opaque to block sunlight and other outdoor light from passing therethrough, a light strip that may extend along a perimeter of the sunrise shade, and a shade cover layer that extends over the light strip and may act as a diffusing layer for the light emitted by the light devices of the light strip. A shade cover layer may be configured over the light strip and may also diffuse light emitted by the light devices.

The light devices may be configured in a pattern along the light strip, with the first light device and second light device being paired adjacent each other and the red light device separated. There may be fewer red light devices than the first and second light devices, wherein the first and second light devices are configured at a ratio to the red light device of 1:1 or more, 1.5:1 or more, 2:1 or more, 3:1 or more, 5:1 or more and any range between and including the ratios provided.

The sunrise shade includes a blackout shade with a light strip configured around the perimeter and a shade cover layer extending over the light strip and blackout shade. The diffusion cover is shown as a strip of material that also extends along the perimeter of the sunrise shade and over the light strip. The light strip may be configured with a diffusion cover over the light devices of the light strip. The diffusion cover may diffuse the light to provide a more dispersed light.

A light device, such as a light strip may extend along a length about the perimeter of the blackout shade that enables the light to be emitted to mimic the sunlight through a window. This elongated light device emits light along a length of about 1 m or more, about 1.25 m or more, about 1.5 m or more, about 2.0 m or more, and any range between and including the length of light emission along the light strip provided. A single-point light source, such as a bulb would not produce the same large profile of light emission as a light strip configured around the perimeter of a blackout shade. Put another way, the light strip emits light around an area of the blackout shade, wherein the light strip extends up along one side of the blackout shade, across the blackout shade to the opposing side of the blackout shade, and then down along the opposing side. A blackout shade may be configured to cover a variety of windows, such as a widow with a width of about 75 cm and a height of about 1.5 m or even 2 m or more. The area encompassed or enclosed by this extension and configuration of the light strip is very much larger than the area of a light bulb, which may only be about 25 $cm^2$. The area encompassed by the light strip on the blackout shade may be about 0.5 $m^2$, about 0.75 $m^2$, about 1 $m^2$, about 1.5 $m^2$, or even 2 $m^2$, and any range between and including the values provided.

A bedroom may be configured with a large window or double wide window from a standard window which is usually about 60 cm or more, about 75 cm or more, or even about 1 m or more. A double wide or wider window may be about 1.0 m or more, about 1.5 m or more, for example. Two blackout shades may be used to cover a larger window and the two blackout shades may be coupled together by a clip or fastener, such as a hook-and-loop fastener, or magnets.

The sunrise wake system produces a sunrise profile of emitted light that changes temperature (K) by varying the wavelength of the light emitted from the light strip. Also, the intensity of the light may gradually increase from the initial light phase to the warming temperature phase. Red light devices may emit red light initially in the initial light phase of the sunrise profile. The period of time for the initial light phase may be set by the user and may be about 5 minutes or more, to about 10 minutes or more. Then the first light device and the second light device emit light in the warming temperature phase of the sunrise profile which is a gradual decrease in temperature from the end of the initial light phase, and again this phase may be set by the user and may be about 5 minutes or more, to about 10 minutes or more. Finally, the first light device and second light device emit light to increase the temperature of the emitted light from the end of the warming temperature phase in a cooling temperature phase, and again this phase may be set by the user and may be about 5 minutes or more, to about 10 minutes or more.

An exemplary light strip has a plurality of first-light devices and second-light devices and a plurality of red-light devices that emit respectively a first-emitted light, a second-emitted light, and red-emitted light. The red light device may emit red light initially in the initial light phase of the sunrise. Then the first light device and the second light device may emit light in the warming temperature phase followed by a cooling temperature phase of the sunrise profile. The first light device and second light device may emit different wavelengths of light, with a wavelength differential such as 50 nm or more 100 nm or more, or 250 nm or more, or even 500 nm or more between the first and second light devices. This combination of different wavelengths enables emitted light from the light strip to have a temperature in the range from about 1,000K to about 10,000K or more, about 12,000K or more, about 15,000K or more, and any range between and including the values provided.

The summary of the invention is provided as a general introduction to some of the embodiments of the invention and is not intended to be limiting. Any specific measurements, numerical values, time durations, or examples provided are for illustrative purposes only and should not be construed as limiting the scope of the invention. The invention encompasses variations, modifications, and alternative configurations that achieve similar results or address similar problems as those described in the embodiments.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
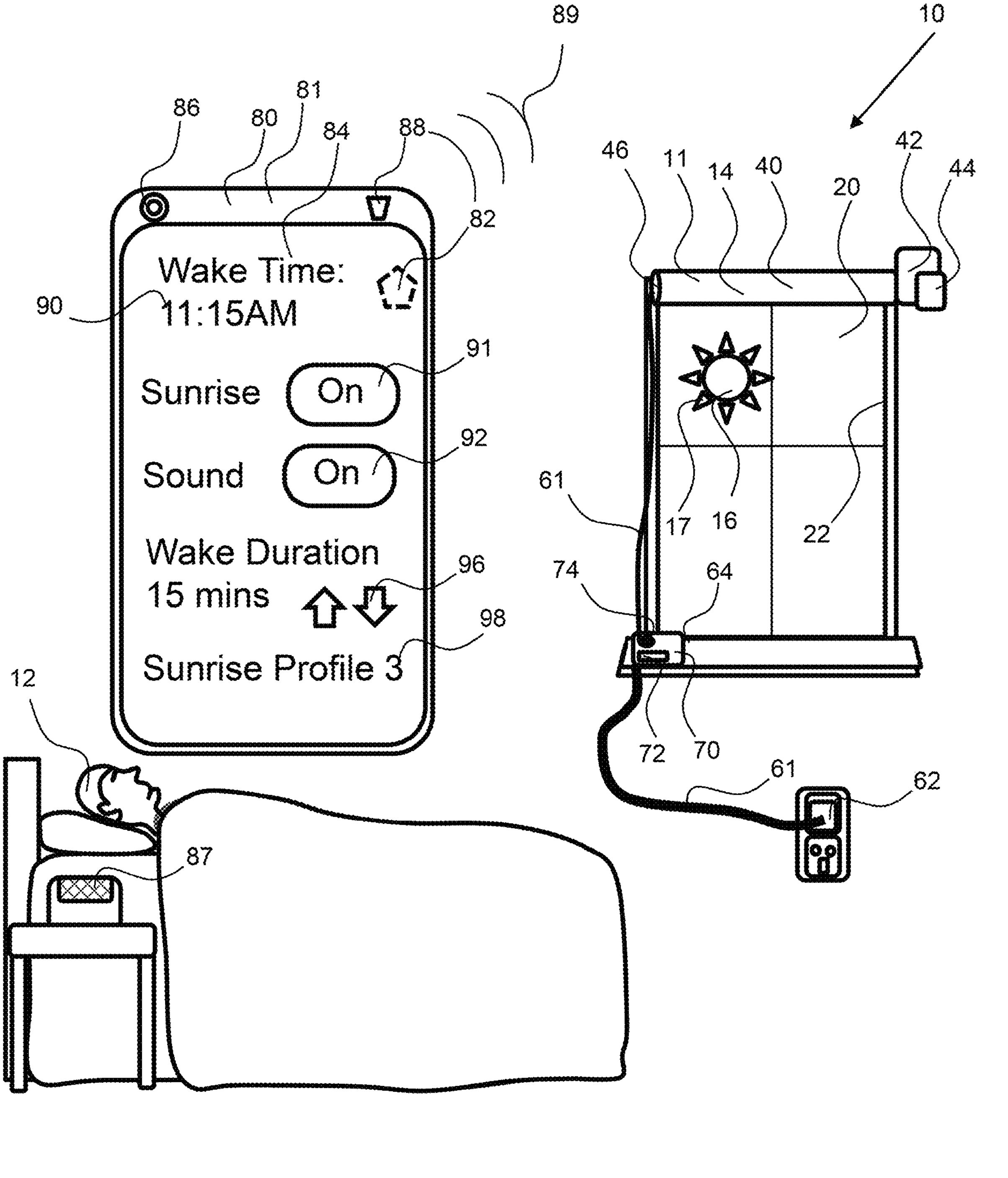
FIG. 1 shows an exemplary sunrise wake system including a sunrise shade assembly having a blackout shade with a light strip coupled thereto and a mobile electronic device that is configured to interface with the sunrise shade assembly to set a wake time.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, uses of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, and improvements are within the scope of the present invention.

Figure 2:
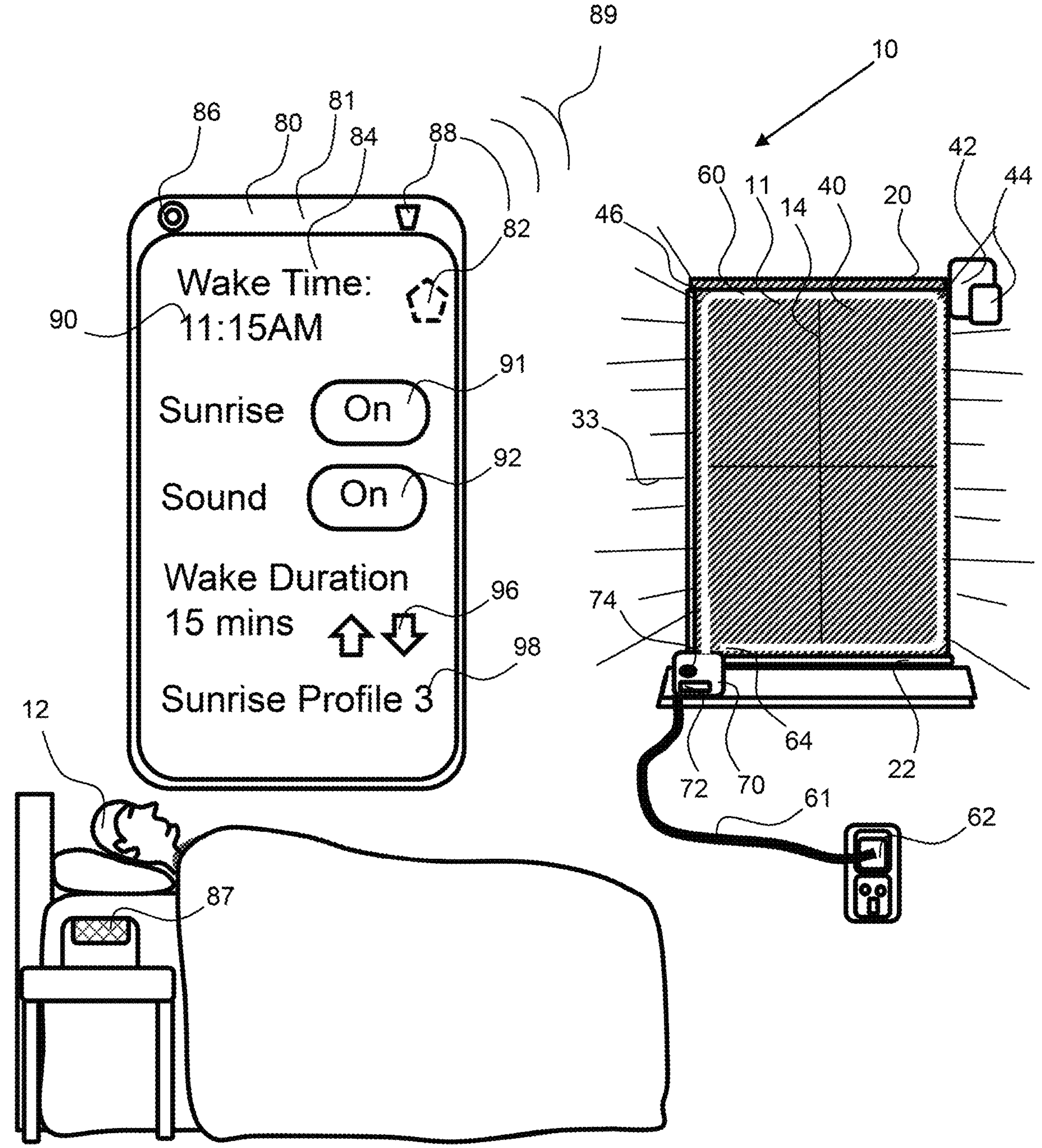
FIG. 2 shows the exemplary sunrise wake system shown in FIG. 1 with the sunrise shade assembly now closed over the window to block light from outside the room from entering through the window and with the light devices of the light strip emitting light to simulate a sunrise.

Referring now to FIGS. 1 and 2, an exemplary sunrise wake system 10 includes a sunrise shade assembly 11 having a blackout shade 40 with a light strip 60 coupled thereto and a mobile electronic device 80 that is configured to interface with the sunrise shade assembly to set a wake time 90. As shown in FIG. 1, the sunrise shade 14 is actuated to an open configuration, such as being rolled up by a shade actuator 42 by a motor 44. In FIG. 2, the sunrise shade is now actuated to a closed configuration over the window 20 to block light from outside the room from entering through the window. The blackout shade 40 extends over the window 20 and preferably beyond the window perimeter 22, the perimeter of the glass portion of the window.

The blackout shade may block the sunlight 17 from the sun 16 (shown in FIG. 1) and have no light transmission through the blackout shade. The light strip 60 may extend substantially around the window perimeter and/or blackout shade, or at least 50% or more of the length of the perimeter, and preferably 70% or even 80% to 90% or more of a perimeter length of the window and/or blackout shade. This long length around the window produces a more realistic sunrise light emission. The light strip may extend to an extended end 64, as shown in FIG. 2.

A mobile electronic device 80, such as a mobile phone 81, may be interfaced with a shade controller 70 of the sunrise wake system 11 to set wake times, set the light strip to illuminate via the sunrise input 91, set a sound to be emitted, or change the type of sound via the sound input 92, set a wake duration with a wake duration input 96, and set a sunrise profile via a sunrise profile input 98. The controller may have a wireless signal transceiver 74 to receive instructions from the mobile phone 81. The mobile electronic device 80 may include a controller 82 such as a microprocessor and a wireless signal transceiver 88 that sends a wireless signal 89 to a wireless signal receiver of the sunrise wake system 11 or more specifically to the sunrise shade assembly 11. The mobile phone 81 may have an interface screen 84, which may be a touch screen.

Figure 3:
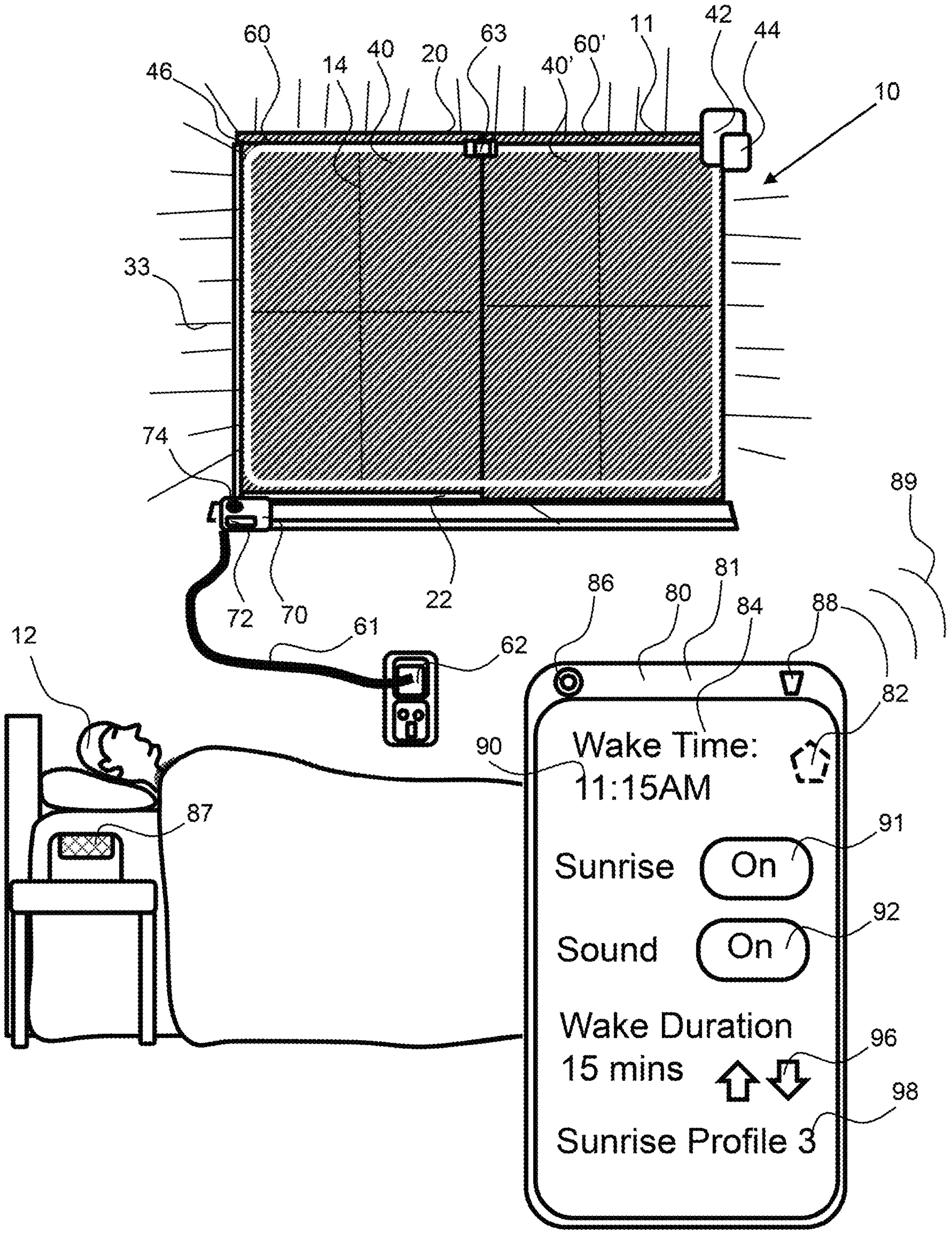
FIG. 3 shows the exemplary sunrise wake system incorporating two separate blackout shades each with a light strip attached thereto and coupled together by a strip connector wherein power from a single controller provides power to a first light strip and then to a second light strip through the strip connector.
Figure 4:
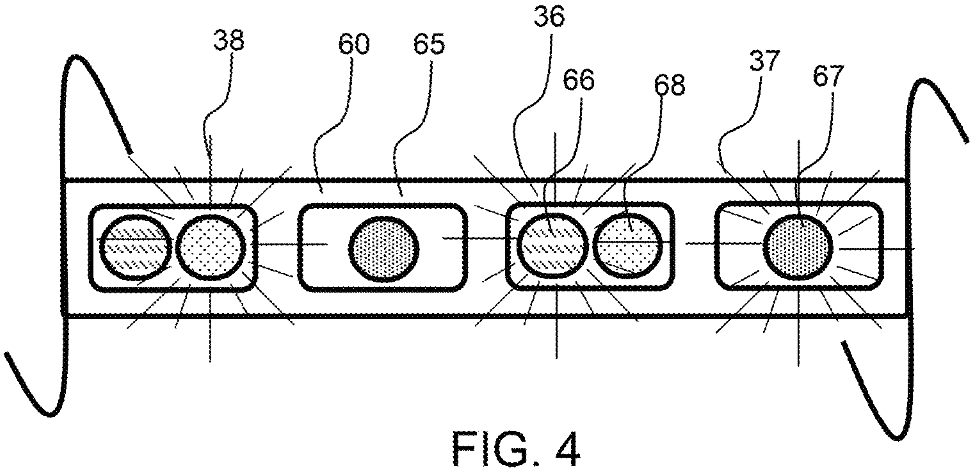
FIG. 4 shows a top view of an exemplary light strip including pairs of first and second light devices producing different wavelengths of light and a red-light device configured to emit red light.

As shown in FIG. 2, and with reference to FIGS. 3 and 4, a person 12 has set a wake time of 11:15 am and has turned on the sunrise and the alarm sound. Also, they have set the wake duration for 15 minutes and sunrise profile 3. Therefore at 11:00 am, the light strip will begin to emit, emitted light 33 from the light strip 60. The light profile may begin with red emitted light 37 being emitted from the red light devices 67 and then include first emitted light 36 and second emitted light 38 emitted from the respective first light device 66 and second light device 68. The light strip may continue to emit light from the light strip after the 15-minute wake duration or the sunrise shade 14 may actuate to an open configuration as shown in FIG. 1 to allow natural sunlight to enter the room. The shade actuator 42 may move the sunrise shade with the light strip to an open configuration by rolling the sunrise shade into a spool about a spool-shaft 46. The light strip may be flexible and include light-emitting diode (LED) devices.

The sunrise shade assembly 11 may be powered by a battery 72, which may be a rechargeable battery or may include an electrical plug 62 that can be plugged into a power source, such as an electrical outlet, and have a strip power cord 61 extending from the electrical outlet to the battery, or directly to the power strip when being directly powered by from electrical power from the electrical outlet.

The alarm sound may be emitted by the mobile electronic device 80, such as by a speaker 86 on the mobile electronic device, or mobile phone 81, or from a speaker 87, an auxiliary speaker, that is coupled with the mobile electronic device. The speaker on the nightstand may be coupled to the mobile electronic device via a wire, or via a wireless signal, such as a short-range wireless signal having a range of about 50 m or less, 40 m or less, 25 m or less, or even about 15 m or less, such as a Bluetooth signal. The alarm sound may be selected as desired and may be natural sounds as described herein, sounds from nature, or music, or a more traditional alarm sound such as a buzzer. As described herein, the sound may initially be emitted at a low volume or a first-decibel level and then increase in volume over time to a second-decibel level that is greater than the first-decibel level. Also, the type of sound emitted may change over time. Natural sounds, such as birds chirping may initially be emitted and then towards the end of the sunrise profile, music may be played and then eventually a traditional alarm buzzer sound may be emitted.

As shown in FIG. 3, an exemplary sunrise wake system 10 incorporates two separate blackout shades 40, 40' each with a light strip attached thereto and coupled together by a strip connector 63 wherein power from a single controller provides power to a first light strip 60 and then to a second light strip 60' through the strip connector 63. The electrical connection of the strip connector may be similar to those on holiday lights, wherein the end of a first light strip is a female electrical plug receiver configured to receive the male electrical plug of a second light strip. The two blackout shades may be held together along a vertical seam formed between the two blackout shades by a hook-and-loop fastener, clips, or magnetic fasteners.

Referring now to FIGS. 4 to 7, an exemplary sunrise shade assembly includes a sunrise shade 14 that includes a blackout shade 40 that is opaque to block sunlight and other outdoor light from passing therethrough, a light strip 60 that may extend along a perimeter of the sunrise shade, and a shade cover layer 50 that extends over the light strip 60 and may act as a diffusing layer for the light emitted by the light devices of the light strip. A shade cover layer 50 may be configured over the light strip and may also diffuse light emitted by the light devices.

Figure 5:
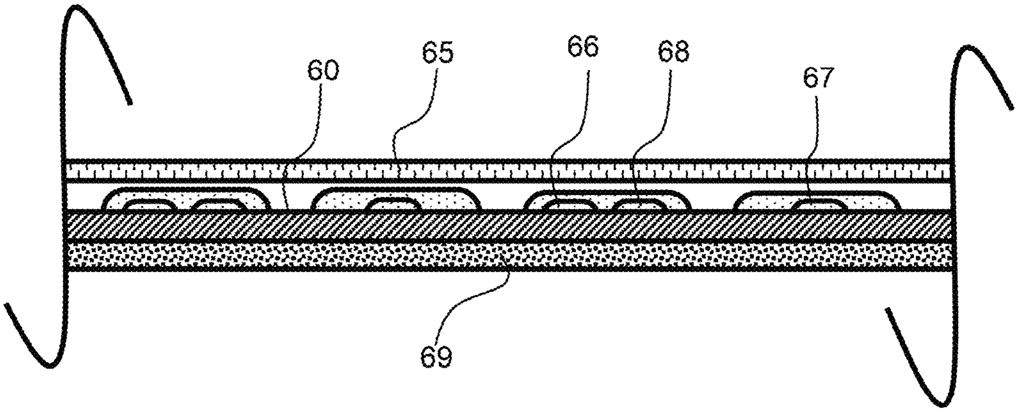
FIG. 5 shows a side view of the exemplary light strip shown in FIG. 2 with a diffusion cover extending over the light devices of the light strip.
Figure 7:
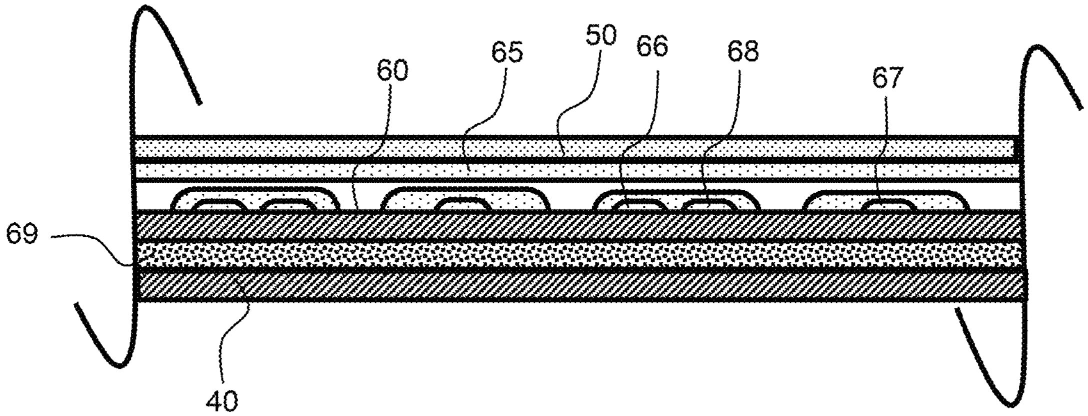
FIG. 7 shows a side view cross-section of the sunrise shade along the edge showing the light strip configured between the blackout shade and the shade cover.
Figure 8:
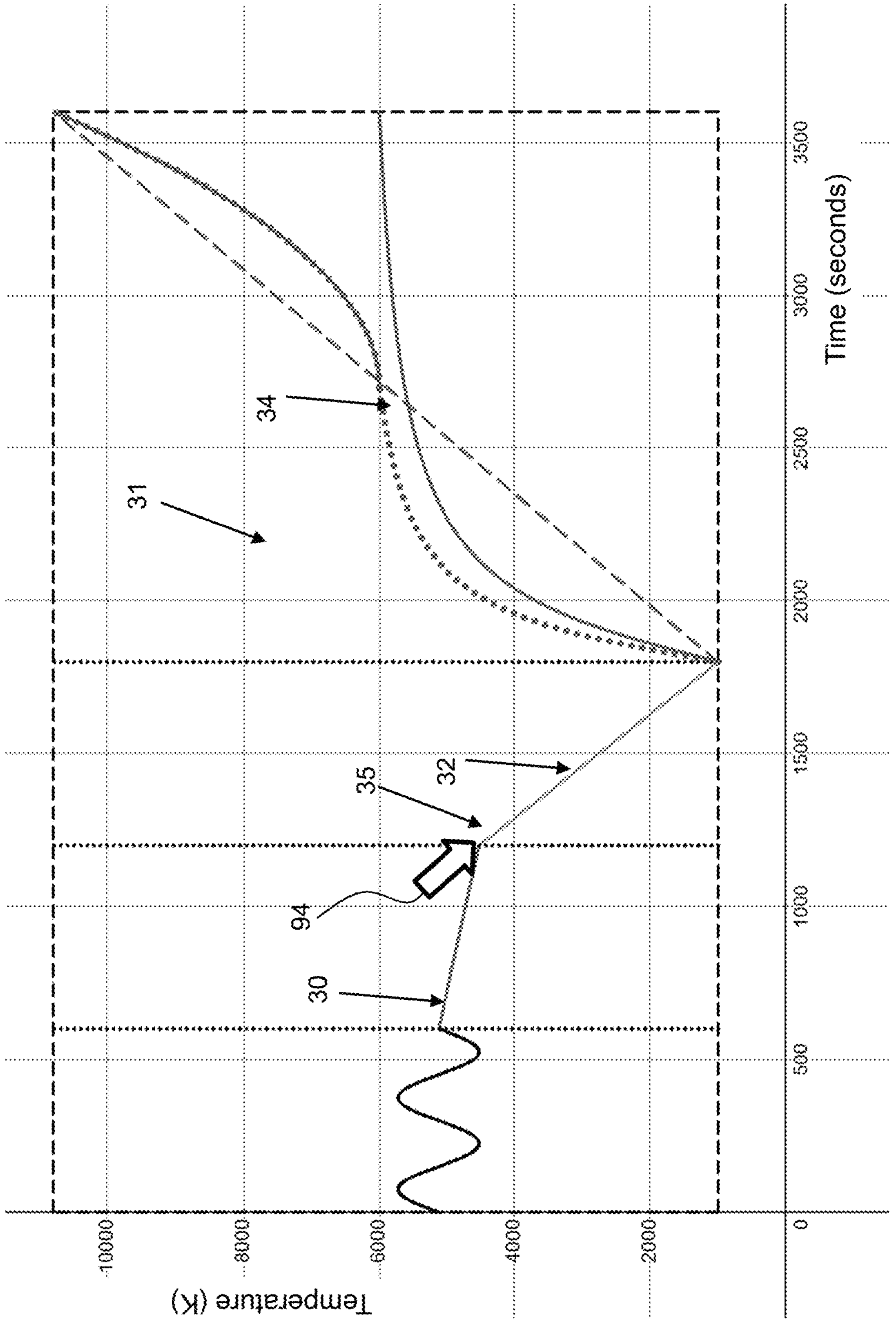
FIG. 8 shows a warming profile that includes light temperature versus time for light emission from the light strip of the sunrise wake system.

As shown in FIGS. 4, 5, and 7, an exemplary light strip 60 has a first-light device 66, a second-light device 68, and a red-light device 67 that emit respectively a first-emitted light 36, a second-emitted light 38, and red emitted light 37. As described herein, the red light device may emit red light initially in the initial light phase 30 of the sunrise as shown in FIG. 8. Then the first light device and the second light device may emit light in the warming temperature phase 32 followed by a cooling temperature phase of the sunrise profile 31. The first light device and second light device may emit different wavelengths of light such as 100 nm or more, 250 nm or more, or even 500 nm or more. This combination of different wavelengths enables emitted light from the light strip 60 to have a temperature in the range as shown in FIG. 8, or from about 1,000K to about 10,000K but may go as high as 15,000K.

As shown in FIG. 4, the light devices may be configured in a pattern along the light strip 60, with the first light device 66 and the second light device 68 being paired adjacent to each other and the red light device 67 separated. There may be fewer red light devices than the first and second light devices, wherein the first and second light devices are configured at a ratio to the red light device of 1.5:1 or more, 2:1 or more, 3:1 or more, 5:1 or more, and any range between and including the ratios provided.

As shown in FIG. 5, the light strip 60 is configured with a diffusion cover 65 over the light devices of the light strip. The diffusion cover may diffuse the light to provide a more dispersed light.

Figure 6:
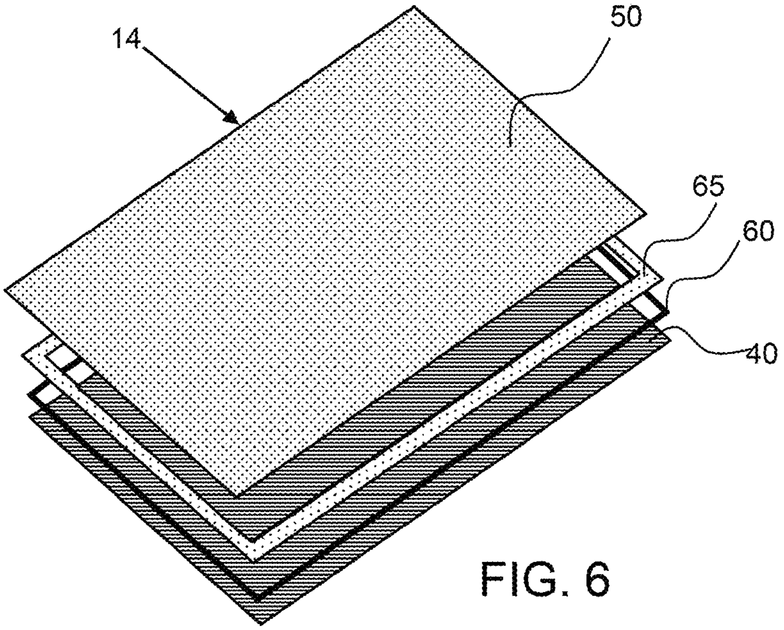
FIG. 6 shows an exploded view of the sunrise shade that includes a blackout shade with a light strip configured around the perimeter and a shade cover layer extending over the light strip and blackout shade.

As shown in FIG. 6 and FIG. 7, the sunrise shade 14 includes a blackout shade 40 with a light strip 60 configured around the perimeter and a shade cover layer 50 extending over the light strip and blackout shade. The diffusion cover 65 is shown as a strip of material that also extends along the perimeter of the sunrise shade 14 and over the light strip 60. An adhesive layer 69 may extend between and bond the light strip 40 to the blackout shade 40.

As shown in FIG. 8, the sunrise wake system produces a sunrise profile of emitted light that changes temperature (K) by varying the wavelength of the light emitted from the light strip. Also, the intensity of the light may gradually increase from the initial light phase 30 to the cooling temperature phase 34. As shown, the red light device may emit red light initially in the initial light phase 30 of the sunrise profile 31. The period of time for the initial light phase may be set by the user and may be about 5 minutes or more, to about 10 minutes or more. Then the first light device 66 and the second light device 68 emit light in the warming temperature phase 32 of the sunrise profile 31 which is a gradual decrease in temperature from the end of the initial light phase 30, and again this phase may be set by the user and may be about 5 minutes or more, to about 10 minutes or more. Finally, the first light device and second light device emit light to increase the temperature of the emitted light from the end of the warming temperature phase 32 in a cooling temperature phase 34, and again this phase may be set by the user and may be about 5 minutes or more, to about 10 minutes or more.

Figure 9:
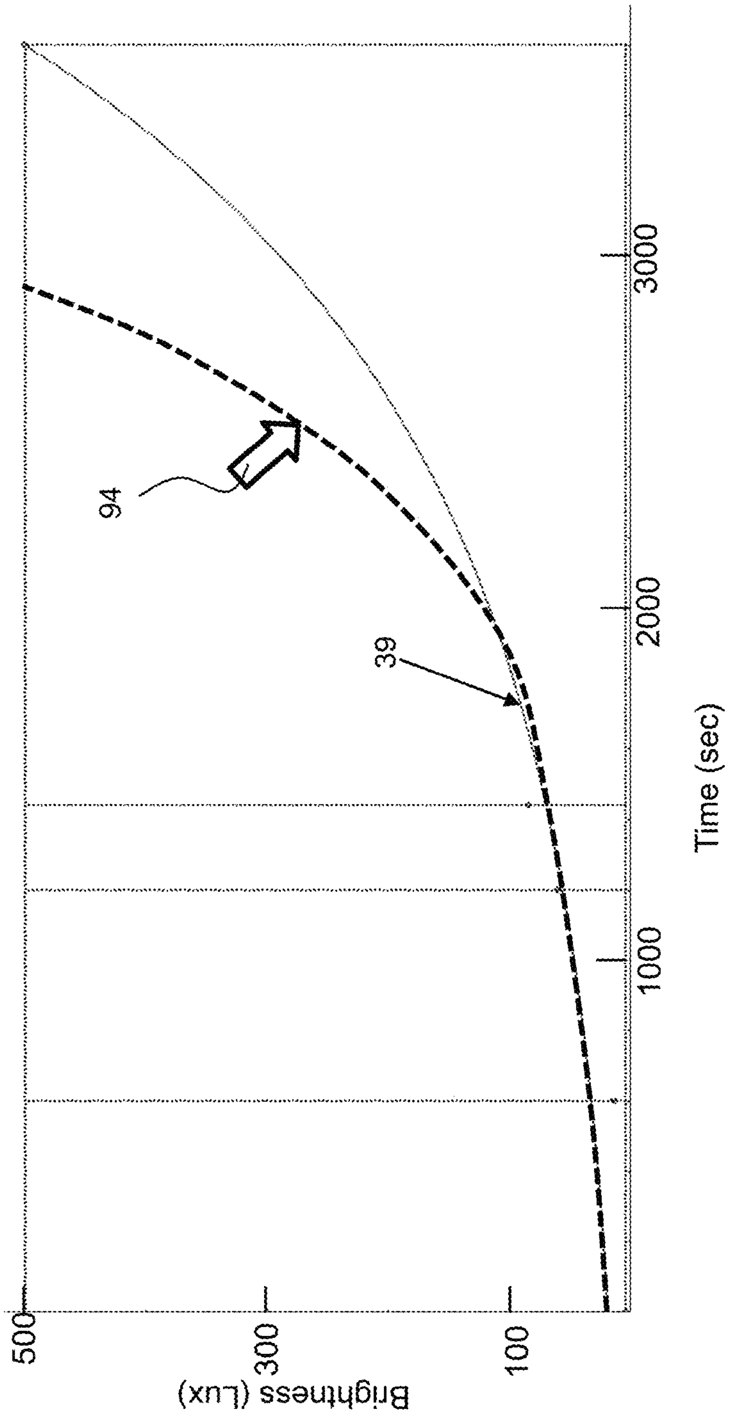
FIG. 9 shows a brightness profile of a sunrise profile with brightness (Lux) versus time in seconds.

As shown in FIG. 9, the brightness profile 39 may be a separate input that in combination with the warming profile 35, shown in FIG. 7, creates the sunrise profile. The brightness in Lux increases slowly and then exponentially increases or increases much more rapidly. A profile slider feature 94, as depicted by the pointer may enable a user to click on a profile display, warming profile 35 shown in FIG. 8, and/or brightness profile 39 and slide the profile line to adjust the respective profile as indicated by the dashed line. The dashed line may be the adjusted profile wherein the sunrise profile is shorter and increases in light intensity (Lux) more rapidly than the original sunrise profile shown.

It will be apparent to those skilled in the art that various modifications, combinations, and variations can be made in the present invention without departing from the scope of the invention. Specific embodiments, features, and elements described herein may be modified, and/or combined in any suitable manner. Thus, it is intended that the present invention cover the modifications, combinations, and variations of this invention provided they come within the scope of the appended claims and their equivalents.

What is claimed is:

1. A sunrise wake system comprising:

a) sunrise shade assembly comprising:

i) a sunrise shade comprising:

a blackout shade configured over a window to prevent sunlight from entering a room;

wherein the blackout shade is opaque and extends over the window to prevent sunlight from entering said room when in a closed configuration;

a light strip coupled to the blackout shade, said light strip comprising;

a plurality of light devices configured to emit an emitted light; and a diffusion cover configured over the light devices to diffuse said emitted light;

wherein the light strip extends a continuous length of at least 1 m around a perimeter of the blackout shade;

wherein the light strip extends along at least 50% of a perimeter length of the blackout shade; and wherein a first light device of the plurality of light devices emits a first emitted light and a second light device of the plurality of light devices emits a second emitted light;

ii) a wireless signal receiver; and iii) a shade controller;

wherein the first emitted light has a wavelength of light that is at least 100 nm different than the second emitted light;

wherein the light strip operates a sunrise profile that produces changing temperature and wavelength of emitted light from the light strip, from an initial light phase to an end of said sunrise profile;

wherein the sunrise profile produces an increasing intensity of emitted light from the light strip from an initial light phase to an end of said sunrise profile;

b) a mobile electronic device comprising:

i) a controller;

ii) a wireless signal transmitter; and iii) a wake time input;

wherein the controller sends a wireless signal to the wireless signal receiver of the sunrise shade assembly with a wake time and wherein the light strip initiates said sunrise profile at said wake time.

2. The sunrise wake system of claim 1, wherein the plurality of lights further includes a red light device that emits a red emitted light having a wavelength of between 620 nm to 750 nm.

3. The sunrise wake system of claim 1, wherein the blackout shade is configured to move from said closed configuration to an open configuration, wherein in said open configuration the blackout shade is rolled up into a spool.

4. The sunrise wake system of claim 3, wherein the sunrise shade assembly further comprises an actuator to move the sunrise shade from an open configuration to a closed configuration over a window, and wherein the actuator comprises a spool and wherein the sunrise shade is spooled around said spool when in said open configuration.

5. The sunrise wake system of claim 4, wherein the sunrise shade assembly further comprises a motor coupled with the actuator to move the sunrise shade from an open configuration to a closed configuration.

6. The sunrise wake system of claim 5, wherein the actuator comprises a spool and wherein the sunrise shade is spooled around said spool by said motor to actuate the sunrise shade to said open configuration.

7. The sunrise wake system of claim 5, wherein the sunrise shade assembly further comprises a battery to power the light strip and the shade controller and the motor.

8. The sunrise wake system of claim 1, wherein the sunrise shade assembly further comprises a battery to power the light strip and the shade controller.

9. The sunrise wake system of claim 1, wherein the light strip extends a continuous length along one side of the blackout shade, across the blackout shade to an opposing side of the blackout shade and also along said opposing side.

10. The sunrise wake system of claim 1, wherein the sunrise shade assembly further comprises a shade cover layer.

11. The sunrise wake system of claim 10, wherein the shade cover layer is translucent and diffuses the emitted light.

12. The sunrise wake system of claim 1, wherein the mobile electronic device comprises a sunrise input.

13. The sunrise wake system of claim 1, wherein the mobile electronic device comprises a sound input.

14. The sunrise wake system of claim 13, wherein the mobile electronic device comprises a speaker to emit an alarm sound.

15. The sunrise wake system of claim 1, wherein the mobile electronic device comprises a wake duration input.

16. The sunrise wake system of claim 1, wherein the mobile electronic device comprises a sunrise profile input.

17. The sunrise wake system of claim 1, wherein the mobile electronic device is a mobile phone.

18. The sunrise wake system of claim 17, wherein the mobile phone has a calendar with calendar events and wherein the sunrise wake system interfaces with said calendar and automatically initiates the sunrise profile to start according to calendar events on said calendar.

19. The sunrise wake system of claim 18, wherein the sunrise wake system modifies the duration of the sunrise profile according to a first calendar event start time on said calendar.

20. The sunrise wake system of claim 17, wherein the user provides feedback to the sunrise wake system through the mobile phone and wherein the sunrise wake system modifies the sunrise profile according to said feedback.

21. The sunrise wake system of claim 17, wherein the mobile phone has a display that displays the sunrise profile configured to be modified by a user via the mobile phone.

22. The sunrise wake system of claim 21, wherein the mobile phone includes a profile slider feature that is configured for said user to use to modify a sunrise profile.

23. The sunrise wake system of claim 1, wherein said blackout shade is a first blackout shade and wherein the sunrise wake system further comprises a second blackout shade; wherein the light strip is a first light strip and wherein the sunrise wake system further comprises a second light strip; wherein said first light strip is coupled to said first blackout shade and said second light strip is coupled to said second blackout shade and wherein the first and second light strips are electrically coupled together by a strip connector, wherein the first light strip extends along said perimeter of the first blackout shade and the second light strip extends along a perimeter of the second blackout shade.

24. The sunrise wake system of claim 23, wherein the first light strip comprises a female electrical plug receiver and the second light strip comprises a male electrical plug configured to plug into the female electrical plug receiver to electrically coupled the first and second light strips.

* * * * *